United States Patent
Fujimoto et al.

(10) Patent No.: US 6,365,887 B1
(45) Date of Patent: Apr. 2, 2002

(54) IMAGE READING APPARATUS

(75) Inventors: Hisayoshi Fujimoto; Hiroaki Onishi; Toshihiko Takakura; Norihiro Imamura, all of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/628,450

(22) Filed: Jul. 31, 2000

Related U.S. Application Data

(62) Division of application No. 09/132,276, filed on Aug. 11, 1998, now Pat. No. 6,133,565.

(30) Foreign Application Priority Data

| Aug. 12, 1997 | (JP) | 9-217269 |
| Sep. 2, 1997 | (JP) | 9-237197 |
| Sep. 5, 1997 | (JP) | 9-240702 |

(51) Int. Cl.[7] .............. H04N 1/028; H04N 1/48
(52) U.S. Cl. ............ 250/208.1; 250/234; 250/226; 250/214 A; 358/514
(58) Field of Search ............... 250/234, 235, 250/236, 208.1, 208.2, 226, 214 A; 358/500, 501, 505, 509, 512, 513, 514, 400, 401, 471, 474, 475, 482, 483, 494, 496, 497

(56) References Cited

U.S. PATENT DOCUMENTS

| 4,264,921 A | * | 4/1981 | Pennington et al. ........ 358/511 |
| 5,031,032 A | * | 7/1991 | Perregaux et al. ........... 348/275 |
| 5,055,921 A | * | 10/1991 | Usai ........................... 358/512 |
| 5,119,181 A | * | 6/1992 | Perregaux et al. ........... 348/275 |
| 5,305,122 A | | 4/1994 | Hayashi et al. |
| 5,467,172 A | | 11/1995 | Liao |
| 5,636,040 A | | 6/1997 | Tung |
| 5,734,484 A | | 3/1998 | Yamamoto et al. |
| 5,902,993 A | | 5/1999 | Okushiba et al. |
| 6,051,707 A | | 4/2000 | Hou |
| 6,118,114 A | * | 9/2000 | Fujimoto et al. ......... 250/208.1 |
| 6,133,565 A | * | 10/2000 | Fujimoto et al. ............ 250/234 |
| 6,150,683 A | * | 11/2000 | Merrill et al. .............. 257/292 |
| 6,195,183 B1 | * | 2/2001 | Fujimoto et al. ............ 358/514 |

* cited by examiner

Primary Examiner—John R. Lee
(74) Attorney, Agent, or Firm—Merchant & Gould P.C.

(57) ABSTRACT

An image reading apparatus is provided which includes a cold-cathode tube as a light source for illuminating a document sheet, an inverter for providing the light source with driving power. A connection cable is used for electrically connecting the light source to the inverter. The image reading apparatus also includes three kinds of rows of light receiving elements arranged in the primary scanning direction for detecting the light reflected on the document sheet. A lens array is provided for focusing the reflected light at the respective rows of light receiving elements. The light receiving elements are mounted on a printed circuit board. The light source, the inverter, the lens array and the printed circuit board are supported by a single case of the image reading apparatus.

2 Claims, 15 Drawing Sheets

($\alpha \leq P-L$, $\alpha + \beta = P$)

IMAGE READING APPARATUS

This application is a divisional of application Ser. No. 09/132,276, filed Aug. 11, 1998 now U.S. Pat. No. 6,133,565, which application(s) are incorporated herein by reference.

BACKGROUND OF THE INVENTION

1. Field of the Invention

The present invention relates to an image reading apparatus. More particularly, the present invention relates to a line image scanner for optically reading a document sheet in full color. The present invention also relates to an image sensor chip advantageously used for such an image scanner.

2. Description of the Related Art

An example of conventional image reading apparatus is shown in FIG. 14 of the accompanying drawings. The illustrated reading apparatus includes a light source unit Ba made up of a cold-cathode tube 1' and a mirror 2'. The conventional apparatus also includes an inverter unit Bb for providing driving power to the cold-cathode tube 1' via a flexible cable 3', and a light leading unit Bc provided with mirrors 4a', 4b'. The conventional apparatus further includes an image reading unit Bd provided with a lens 5' and an image sensor 6'.

In operation, the light source unit Ba is reciprocated in the secondary scanning direction under a stationary glass plate 7' on which a document sheet K to be read out is placed. Accordingly, the light leading unit Bc is repeatedly moved in the secondary scanning direction.

The conventional image reading apparatus has been found to be disadvantageous in the following points.

First, the light source unit Ba, the inverter unit Bb and the light leading unit Bc are produced separately from each other. With such an arrangement, it is difficult to accurately position these units to each other. Further, production costs tend to be high since a plurality of separate units need to be manufactured.

Still further, the flexible cable 3' connecting the light source unit Ba to the inverter unit Bb is long enough, so that the reciprocating movement of the light source unit Ba is not hindered. However, as the length of the flexible cable 3' increases, the loss of the driving power provided by the inverter unit Bb to the cold-cathode tube 1' increases. As a result, the luminance of the cold-cathode tube 17 may be unduly reduced.

The conventional image reading apparatus also has the following disadvantage.

Though not shown in FIG. 14, the image sensor 6' includes a plurality of image sensor chips. Each image sensor chip is formed with three rows of light receiving elements extending in the primary scanning direction. A first row is made up of red light receiving elements used for selectively detecting a red component of white light. Similarly, a second row is made up of green light receiving elements used for selectively detecting a green component of white light, while a third row is made up of blue light receiving elements used for selectively detecting a blue component of white light.

Each row of light receiving elements has a pitch P between the light receiving elements in the primary scanning direction. The pitch between the light receiving elements in the secondary scanning direction (which is perpendicular to the primary scanning direction) is also P. As viewed in the secondary scanning direction, each of the light receiving elements has a length of P/2.

For providing color selectivity, color filters are used for the light receiving elements. Specifically, each red light receiving element is covered by a red filter which allows selective permeation of red light, whereas each green light receiving element is covered by a green filter which allows selective permeation of green light. Similarly, each blue light receiving element is covered by a blue filter which allows selective permeation of blue light.

In the conventional image reading apparatus, no attention has been paid to e.g., the thickness of the color filters, and three types of color filters may have the same thickness. With such an arrangement, however, it may be impossible to realize a high-fidelity reproduction of the read image. This is partly because properties of the color filters are not the same for the different color lights (red, green, blue) and partly because properties of the light receiving elements are not the same for the different color lights, either.

Specifically, as shown in FIG. 15, among the three colors (Red, Green and Blue), a conventionally available light receiving element (e.g., phototransistor) has the highest relative sensitivity for red, the second highest relative sensitivity for green, and the lowest relative sensitivity for blue.

FIG. 16 shows relationship between the wave length of incident light and the transmittance of the respective color filters (Red filter, Green filter and Blue filter). As illustrated, the red filter has the highest transmittance, while the green filter has the second highest transmittance, and the blue filter has the lowest transmittance.

As shown in FIG. 17, a typical cold-cathode tube generates white light whose green component has the highest energy ratio compared with those of the red and blue components.

FIG. 18 shows the reflectivity of red (R), green (G) and blue (B) lights on four types of test charts (WHITE, RED, GREEN, BLUE and BLACK test charts). As illustrated, of three colors, blue light is reflected most on the white test chart. Red light is reflected most on the red-test chart, green light is reflected most on the green test chart, and blue light is reflected most on the blue test chart. When the test chart is black, the three color lights are hardly reflected.

FIG. 19 is obtained from a combination of FIG. 16 and FIG. 18. As is shown, when using the white test chart, the green light has the highest product of the transmittance and the reflectivity.

FIG. 20 is obtained from a combination of FIG. 15, FIG. 17 and FIG. 19. FIG. 20 shows the output voltages generated by the three types of light receiving elements (Red, Green and Blue) when the four types of test charts (WHITE, RED, GREEN, BLUE and BLACK) are irradiated with white light. As is shown, when using the white test chart, the green light receiving element generates the highest output voltage. When using the red test chart, the red light receiving element generates the highest output voltage.

Still further, the conventional image reading apparatus is disadvantageous in the following point.

Referring to FIG. 21, for performing image reading for one line, the light receiving elements 8' (only one shown) of each image sensor chip are advanced by the distance P in the secondary scanning direction with respect to the document sheet. During this movement, however, the light receiving element 8' scans a rectangular area having a length of (P+L). This means that image reading for each line is performed for an unduly larger area due to the length L of the light receiving element itself. As a result, with the use of the conventional image reading apparatus, a high-fidelity printout reproduction of the image carried by the document sheet may not be realized.

SUMMARY OF THE INVENTION

It is, therefore, an object of the present invention to provide an image reading apparatus capable of overcoming the disadvantages described above.

Another object of the present invention is to provide an image sensor chip advantageously incorporated in such an image reading apparatus.

According to a first aspect of the present invention, there is provided an image reading apparatus comprising:

a light source for irradiating a document sheet with light;

a power supplier for providing the light source with driving power;

a connection cable for electrically connecting the light source to the power supplier;

at least one row of light receiving elements arranged in a primary scanning direction for detecting the light reflected on the document sheet;

a lens array for focusing the reflected light at the row of light receiving elements;

a printed circuit board for mounting the row of light receiving elements thereon; and a case for supporting the light source, the power supplier, the lens array and the printed circuit board.

The image reading apparatus may further comprise a light reflecting holder formed with a groove for accommodating the light source. The image reading apparatus may also comprise a shield frame for accommodating the light reflecting holder.

Preferably, the shield frame is grounded.

According to a preferred embodiment of the present invention, the case is formed with a first hollow portion for accommodating the light source, a second hollow portion for accommodating the power supplier and a third hollow portion for accommodating the lens array. Further, the case is formed with a cutout for causing the first and the second hollow portions to communicate with each other, the connection cable extending through the cutout.

The light source may comprise a cold-cathode tube, and the power supplier may comprise an inverter.

According to a second aspect of the present invention, there is provided an image reading apparatus comprising:

a light source for irradiating a document sheet with light;

a row of red light receiving elements arranged in a primary scanning direction for detecting a red component of the light reflected on the document sheet, each red light receiving element having a length of L in a secondary scanning direction which is perpendicular to the primary scanning direction;

a row of green light receiving elements arranged in the primary scanning direction for detecting a green component of the reflected light, the row of green light receiving elements being displaced from the row of red light receiving elements by a distance of P in the secondary scanning direction, each green light receiving element having a length of L in the secondary scanning direction;

a row of blue light receiving elements arranged in the primary scanning direction for detecting a blue component of the reflected light, the row of blue light receiving elements being displaced from the row of green light receiving elements by a distance of P in the secondary scanning direction, each blue light receiving element having a length of L in the secondary scanning direction; and a signal selector;

wherein, in performing image reading for one scanning line, the signal selector is arranged to adopt, as a necessary image signal, a voltage generated by each of the light receiving elements during a period when said each light receiving element is moved in the secondary scanning direction relative to the document sheet by a first feed distance, the signal selector being also arranged to disregard, as an unnecessary image signal, a voltage generated by said each light receiving element during a period when said each light receiving element is moved in the secondary scanning direction relative to the document sheet by a second feed distance subsequent to the first feed distance.

The signal selector may be realized by a CPU, a gate array, or a PLA (programmable logic array).

The first feed distance may be equal to (P–L), and the second feed distance may be equal to L.

Alternatively, the first feed distance may be smaller than (P–L), and the second feed distance may be greater than L.

The light source may comprise a cold-cathode tube or a light-emitting diode.

According to a third aspect of the present invention, there is provided an image reading apparatus comprising:

a light source for irradiating a document sheet with light;

a row of red light receiving elements arranged in a primary scanning direction for detecting a red component of the light reflected on the document sheet, each red light receiving element having a length of L in a secondary scanning direction which is perpendicular to the primary scanning direction;

a row of green light receiving elements arranged in the primary scanning direction for detecting a green component of the reflected light, the row of green light receiving elements being displaced from the row of red light receiving elements by a distance of P in the secondary scanning direction, each green light receiving element having a length of L in the secondary scanning direction;

a row of blue light receiving elements arranged in the primary scanning direction for detecting a blue component of the reflected light, the row of blue light receiving elements being displaced from the row of green light receiving elements by a distance of P in the secondary scanning direction, each blue light receiving element having a length of L in the secondary scanning direction;

a light controller;

wherein, in performing image reading for one scanning line, the light controller is arranged to turn on the light source during a period when each of the light receiving elements is moved in the secondary scanning direction relative to the document sheet by a first feed distance, the light controller being also arranged to turn off the light source during a period when said each light receiving element is moved in the secondary scanning direction relative to the document sheet by a second feed distance subsequent to the first feed distance.

The light controller may be realized by a CPU, a gate array or PLA.

The image reading apparatus may further comprise an output timing controller for regulating output of an image signal from each of the light receiving elements, so that the image signal is output from said each light receiving element when the light source is turned off.

According to a fourth aspect of the present invention, there is provided an image sensor chip comprising:

a chip substrate;

a row of red light receiving elements formed in the chip substrate and arranged in a first direction for detecting red light, each of the red light receiving elements being covered by a red filter;

a row of green light receiving elements formed in the chip substrate and arranged in the first direction for detecting green light, each of the green light receiving elements being covered by a green filter; and a row of blue light receiving elements formed in the chip substrate and arranged in the first direction for detecting blue light, each of the blue light receiving elements being covered by a blue filter;

wherein the red, green and blue filters have predetermined thicknesses, the thickness of the red filter being greater than the thickness of the green filter, the thickness of the green filter being greater than the thickness of the blue filter.

According to a fifth aspect of the present invention, there is provided an image sensor chip comprising:

a chip substrate;

a row of red light receiving elements formed in the chip substrate and arranged in a first direction for detecting red light, each of the red light receiving elements having a red light receiving surface covered by a red filter;

a row of green light receiving elements formed in the chip substrate and arranged in the first direction for detecting green light, each of the green light receiving elements having a green light receiving surface covered by a green filter; and a row of blue light receiving elements formed in the chip substrate and arranged in the first direction for detecting blue light, each of the blue light receiving elements having a blue light receiving surface covered by a blue filter;

wherein an area of the red light receiving surface is smaller than an area of the green light receiving surface, the area of the green light receiving surface being smaller than an area of the blue light receiving surface.

According to a sixth aspect of the present invention, there is provided an image sensor chip comprising:

a chip substrate;

a row of red light receiving elements formed in the chip substrate and arranged in a first direction for detecting red light, each of the red light receiving elements being covered by a red filter;

a row of green light receiving elements formed in the chip substrate and arranged in the first direction for detecting green light, each of the green light receiving elements being covered by a green filter;

a row of blue light receiving elements formed in the chip substrate and arranged in the first direction for detecting blue light, each of the blue light receiving elements being covered by a blue filter;

a first amplifier for the row of red light receiving elements;

a second amplifier for the row of green light receiving elements; and a third amplifier for the row of blue light receiving elements;

wherein an amplification factor of the first amplifier is smaller than an amplification factor of the second amplifier, the amplification factor of the second amplifier being smaller than an amplification factor of the third amplifier.

Other features and advantages of the present invention should become clear from the detailed description to be made hereinafter referring to the accompanied drawings.

DETAILED DESCRIPTION OF THE PREFERRED EMBODIMENT

The preferred embodiments of the present invention will be specifically described below with reference to the accompanying drawings.

Figure 1:
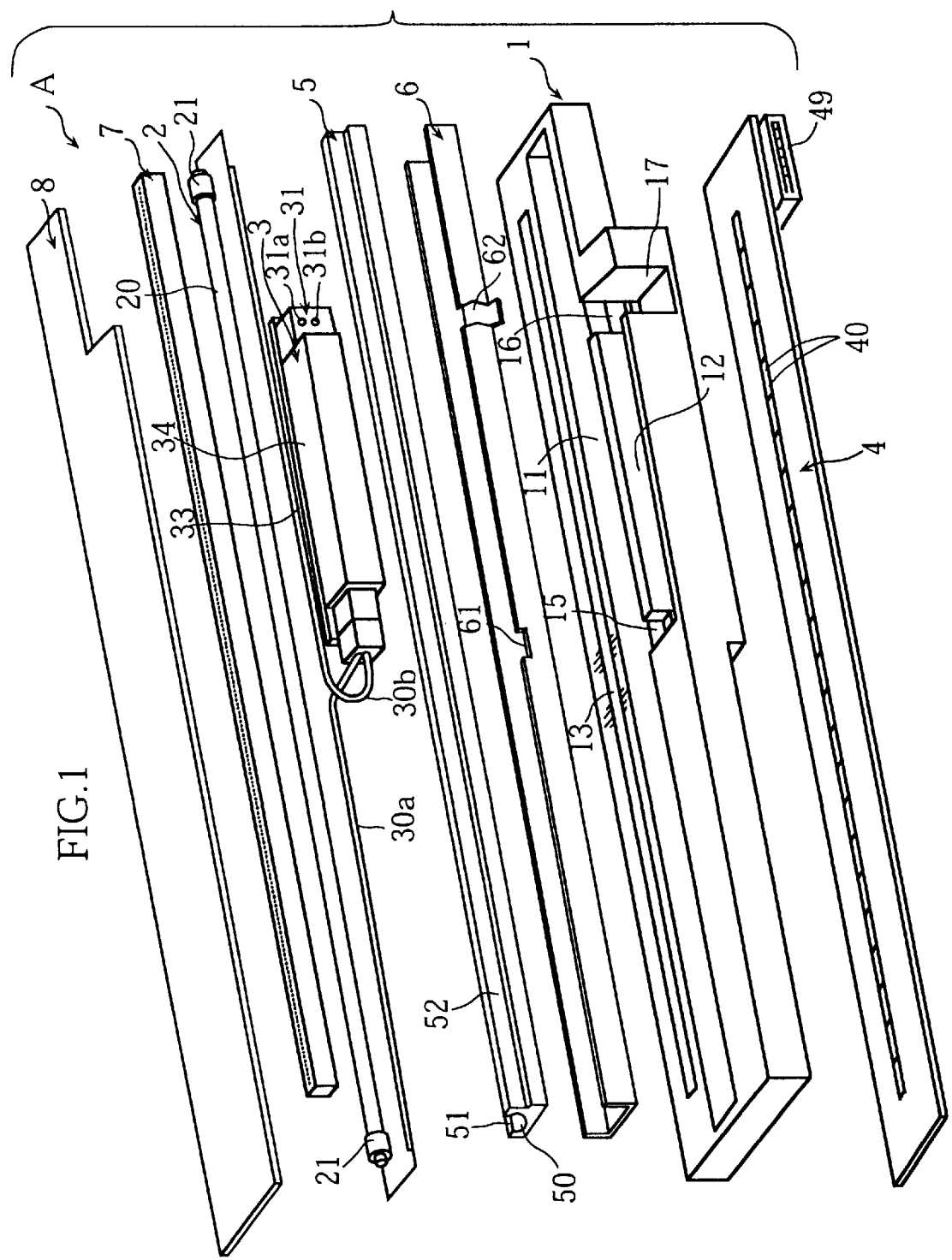
FIG. 1 is an explosive view showing an image reading apparatus according to a first embodiment of the present invention.

Reference is first made to FIG. 1 which is an explosive view showing various components used for an image reading apparatus according to a first embodiment of the present invention. The image reading apparatus of this embodiment is a flat-bed-type line image scanner A which mainly includes a case 1, a cold-cathode tube 2, an inverter 3, a circuit board 4, a light reflecting holder 5, a shield frame 6, a lens array 7, and a transparent cover member 8.

In the illustrated embodiment, the case 1 is elongated in one direction (primary scanning direction N1 in FIG. 2) and has a box configuration for accommodating the cold-cathode tube 2, the inverter 3, the light reflecting holder 5, the shield frame 6 and the lens array 7. The case 1 supports the cover member 8 mounted thereon from above. The case 1 also supports the circuit board 4 attached thereto from below. The case 1 may be made of a synthetic resin for example.

The cold-cathode tube 2 having a light outlet surface 20 serves as a white light source and extends in the primary scanning direction for uniformly irradiating a document sheet with white light over the entire width of the document sheet. In operation, driving power (for example, 600V, 30–160 kHz, 3–5 mA) is applied across the cold-cathode tube 2. If necessary or preferred, the cold-cathode tube 2 may be replaced by one or more white LEDs.

Figure 3:
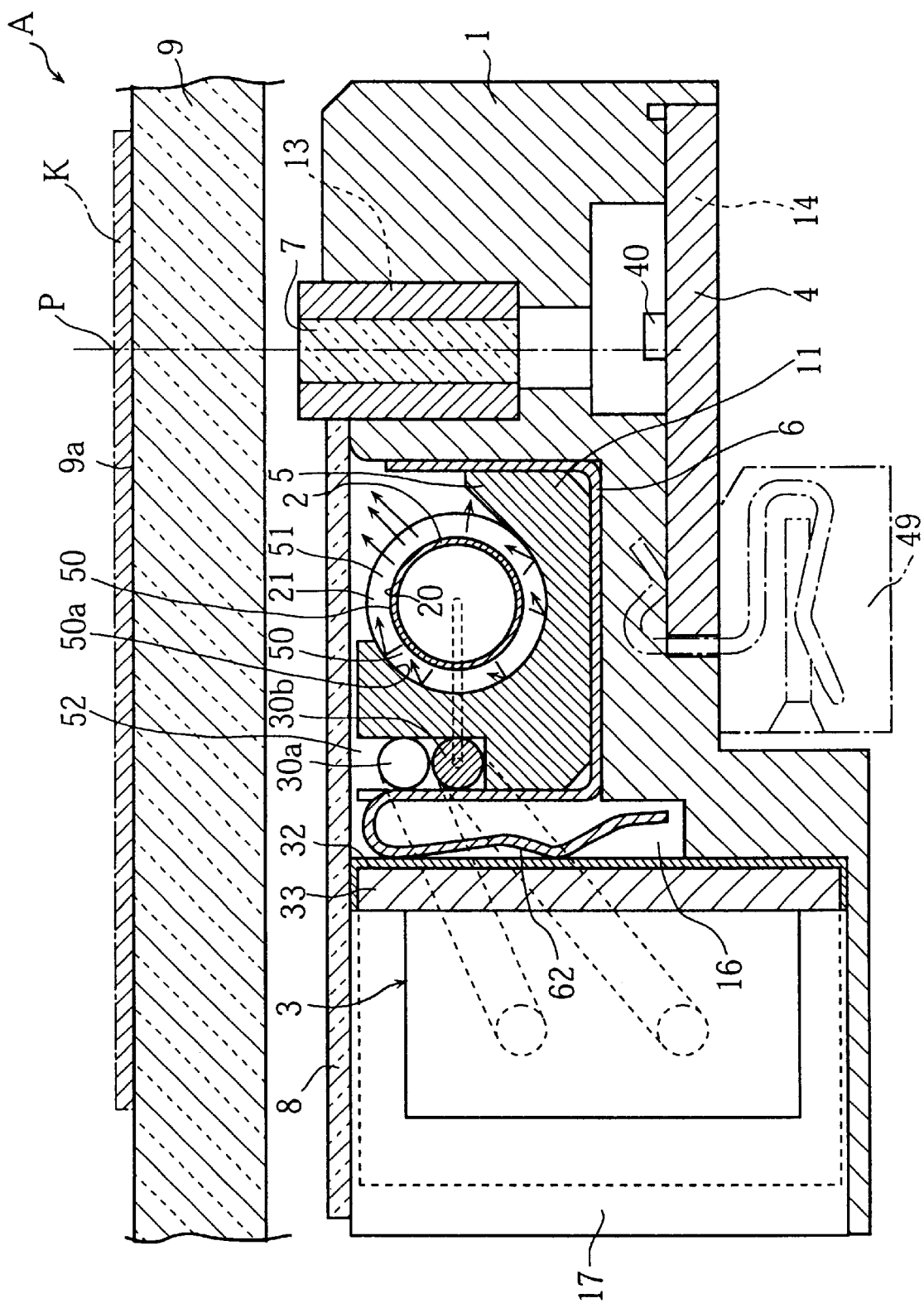
FIG. 3 is a sectional view taken along lines III—III in FIG. 2.

The inverter 3 includes a circuit board 33 on which suitable circuits (not shown) are provided. The inverter 3 serves to convert low-voltage direct current into alternating current of high-voltage and high-frequency. The non-illustrated circuits are covered by a cover case 34. Preferably, the inverter 3 is provided with suitable means for preventing noise generation in the circuits. The inverter 3 includes a power inlet portion 31 provided with two terminals 31a and 31b for input of direct current from an external power source. As best shown in FIG. 3, the circuit board 33 of the inverter 3 has a reverse surface provided with a grounding layer 32 having a sufficiently large area. The grounding layer 32 is electrically connected to the above-mentioned terminal 31b. Output voltage of the inverter 3 is supplied to the cold-cathode tube 2 via two flexible cords 30a and 30b.

The circuit board 4 has an upper surface (inner surface with respect to the case 1) for mounting an array of image sensor chips 40. Though not shown in FIG. 1, the upper surface of the circuit board 4 is formed with a wiring pattern. The details of each image sensor chip 40 will be described hereinafter.

As shown in FIG. 1, the circuit board 4 is elongated in the primary scanning direction, and the array of image sensor chips 40 extends in the primary scanning direction. Further, as also shown in FIG. 1, the circuit board 4 is provided with a connector 49 for establishing connection with an external circuit or unit.

The light reflecting holder 5 supports the cold-cathode tube 2 within the case 1 while efficiently reflecting white light toward the cover member 8 with a high reflectivity. Due to the provision of the light reflecting holder 5, the white light generated by the cold-cathode tube 2 is concentratively directed to a scanning position P (see FIG. 3) on a glass plate 9 as a strip or line extending in the primary scanning direction.

For accommodating the cold-cathode tube 2, the light reflecting holder 5 is provided with a groove 50 having an opening 51. The groove 50 has an inner surface 50a which is preferably white for effective light reflection. The cross-sectional diameter of the groove 50 is larger than that of the cold-cathode tube 2 but equal to the outer diameters of rubber rings 21 fixed around the ends of the cold-cathode tube 2. Such an arrangement is advantageous in keeping the cold-cathode tube 2 away from the light reflecting holder 5.

In this way, heat generated by the cold-cathode tube 2 is prevented from dissipating through direct contact with the light reflecting holder 5. As a result, the cold-cathode tube 2 is kept at appropriate temperatures, thereby providing a sufficient amount of light needed for performing proper image reading.

Figure 4:
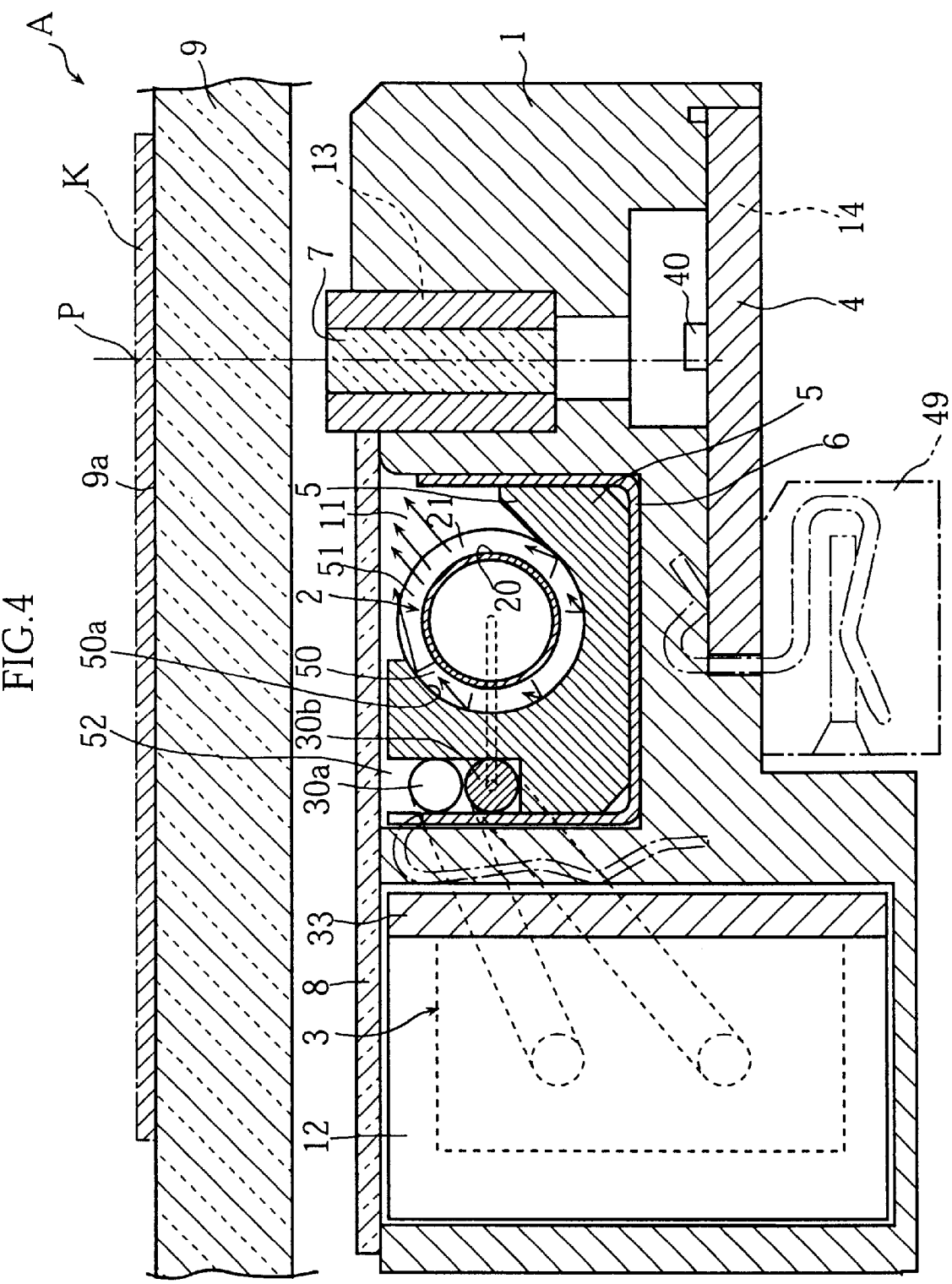
FIG. 4 is a sectional view taken along lines IV—IV in FIG. 2.

As shown in FIGS. 3 and 4, the light reflecting holder 5 is provided with a cutout 52 for accommodating the flexible cords 30a and 30b.

The shield frame 6, which may be prepared by press-working a metal plate, is also elongated in the primary scanning direction. The shield frame 6, the cold-cathode tube 2 and the light reflecting holder 5 are substantially equal in length, as can be seen from FIG. 1. The shield frame 6 has a rectangular cross section with its top side missing (see also FIG. 3 or 4). The shield frame 6 is provided with a cutout 61 for allowing passage of the flexible cords 30a–30b, and with a clip-like terminal 62. The clip-like terminal 62, used for grounding purposes of the shield frame 6, may be prepared by simply bending an integral portion of the terminal 62.

Figure 5:
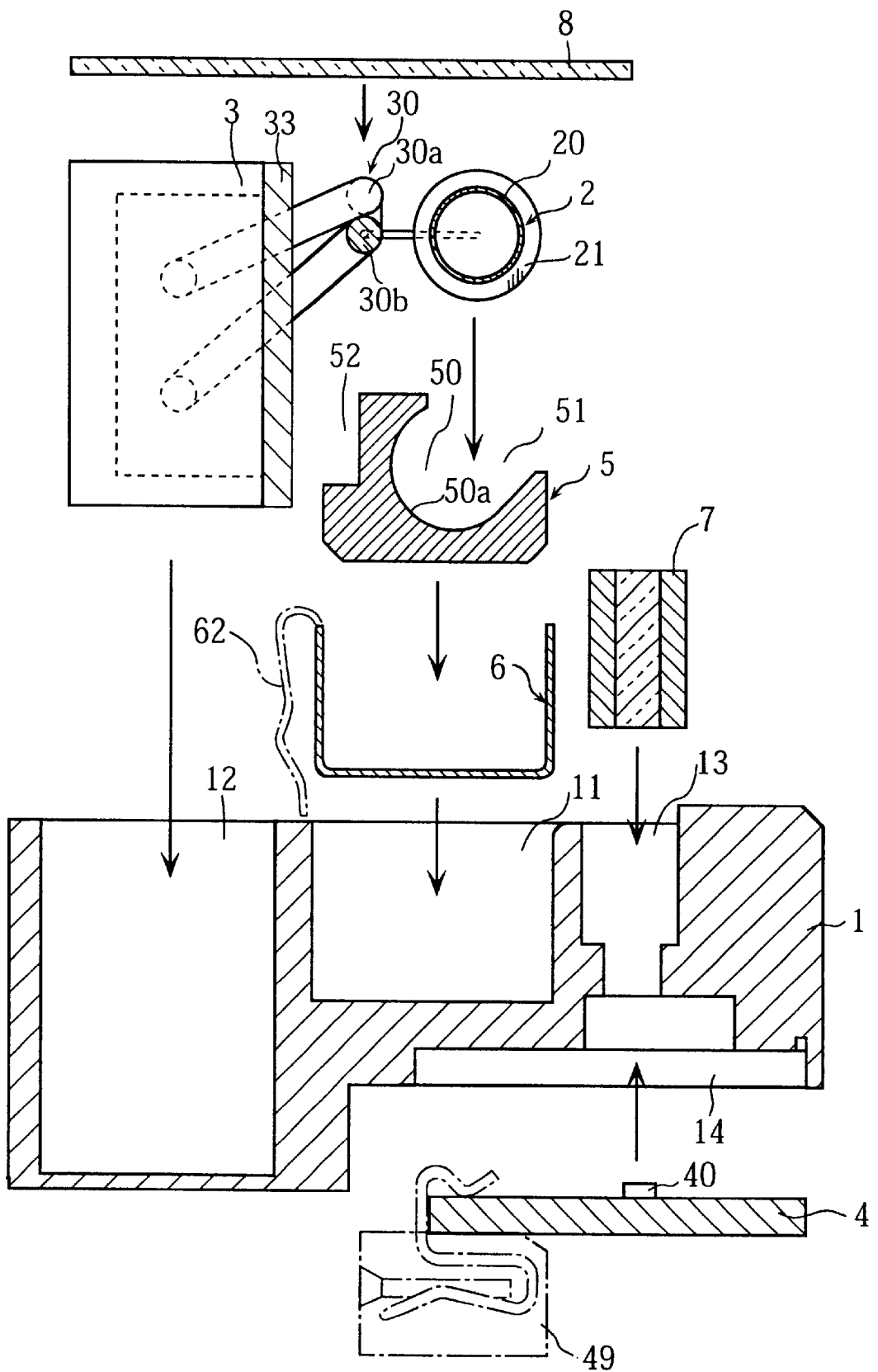
FIG. 5 is an explosive view of the image reading apparatus of FIG. 1, showing how the apparatus is assembled.

As best shown in FIG. 5, the case 1 is formed with an upwardly open hollow portion 11 (first hollow portion) large enough to accommodate the shield frame 6. Thus, after the cold-cathode tube 2, the light reflecting holder 5 and the shield frame 6 are put together, they are easily accommodated together in the case 1 by simply being inserted into the first hollow portion 11.

The case 1 is also formed with another upwardly open, hollow portion 12 (second hollow portion) adjacent to the first hollow portion 11. The second hollow portion 12 is used for accommodating the inverter 3. As shown in FIG. 1, the two hollow portions 11–12 are communicated with each other via a cutout 15 for allowing passage of the flexible cords 30a–30b. The two hollow portions 11–12 are also communicated via another cutout 16 for accommodating the clip-like terminal 62. As shown in FIG. 3, the grounding layer 32 and the clip-like terminal 62 are held in facing relation to each other, establishing electrical connection therebetween.

Figure 2:
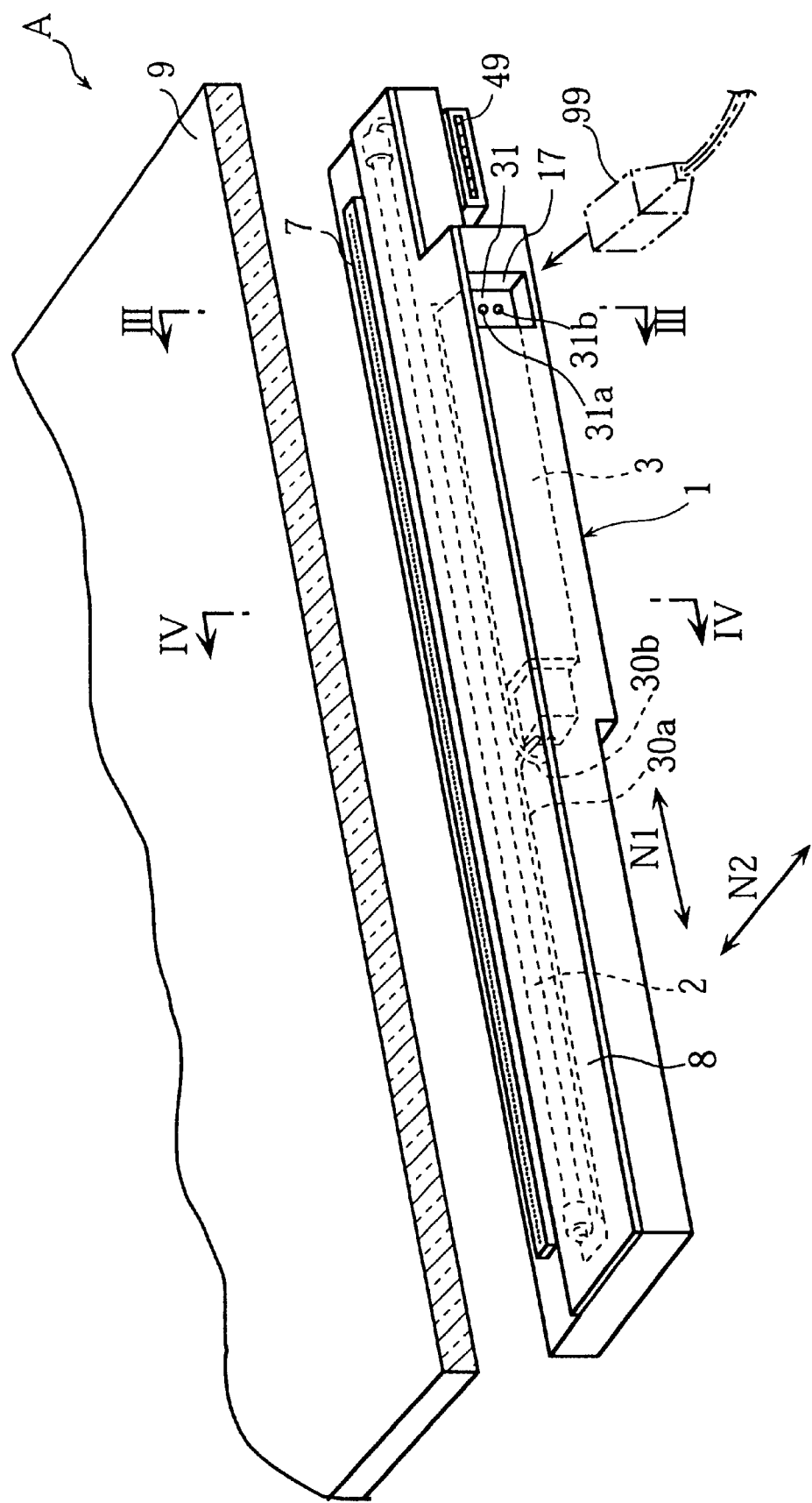
FIG. 2 is an enlarged view schematically showing a principal portion of the image reading apparatus of FIG. 1.

The first and second hollow portions 11–12 are closed by the cover member 8. Thus, high-voltage portions of the inverter 3 accommodated in the second hollow portion 12 will not be accidentally touched. However, as shown in FIG. 2, the power inlet portion 31 remains exposed to the exterior through a window 17 formed in a side surface of the case 1. In this arrangement, electric connection is readily established to the inverter 3 by inserting a plug 99 into the window 17.

The lens array 7 includes an array of selfoc lenses (self-focusing lenses) extending in the primary scanning direction. The lens array 7 is positioned between the glass plate 9 and the array of image sensor chips 40 for focusing the light reflected on a document sheet K onto the array of image sensor chips 40, thereby forming non-inverted, non-magnified images read from the document sheet. As best shown in FIG. 5, the case 1 is formed with another upwardly open, hollow portion 13 (third hollow portion) for accommodating the lens array 7.

The image sensor chips 40 are arranged to output image signals in accordance with the luminous energies of the light reflected on the document sheet. The circuit board 4 may be made of a resin material such as epoxy or ceramic material. As shown in FIG. 5, the case 1 is formed with a downwardly open, fourth hollow portion 14 for accommodating the circuit board 4.

In the illustrated embodiment, the inverter 3 is positioned close to the cold-cathode tube 2. With such an arrangement, the flexible cords 30a–30b extending between the inverter 3 and the cold-cathode tube 2 can be short accordingly. Thus, it is possible to reduce power loss along the flexible cords 30a–30b, and the amount of light generated by the cold-cathode tube 2 is advantageously increased.

As stated above, high-frequency driving power generated by the inverter 3 is supplied to the cold-cathode tube 2 via the flexible cords 30a –30b. In this arrangement, high-frequency noises may unduly be emitted from the flexible cords 30a–30b and/or the cold-cathode tube 2. Without taking proper countermeasure, those noises may adversely affect image signals supplied from the image sensor chips 40, thereby making it impossible to realize a high-fidelity printout reproduction of the read image. In this regard, the image sensor chips 40 of the present invention are shielded from the cold-cathode tube 2 and the flexible cords 30a–30b by the shield frame 6. Thus, the above-mentioned problem is overcome.

According to the present invention, as previously described, the cold-cathode tube 2, light reflecting holder 5 and shield frame 6 are put together, without using bolts or an adhesive for example. Further, it is possible to accommodate the assembly of the above-mentioned three elements 2, 5, 6 within the case 1 by simply fitting it into the first hollow portion 11. Similarly, it is possible to put the inverter 3 and the lens arrays 7 into place within the case 1 by simply fitting them into the hollow portions 12 and 13, respectively.

Figure 6:
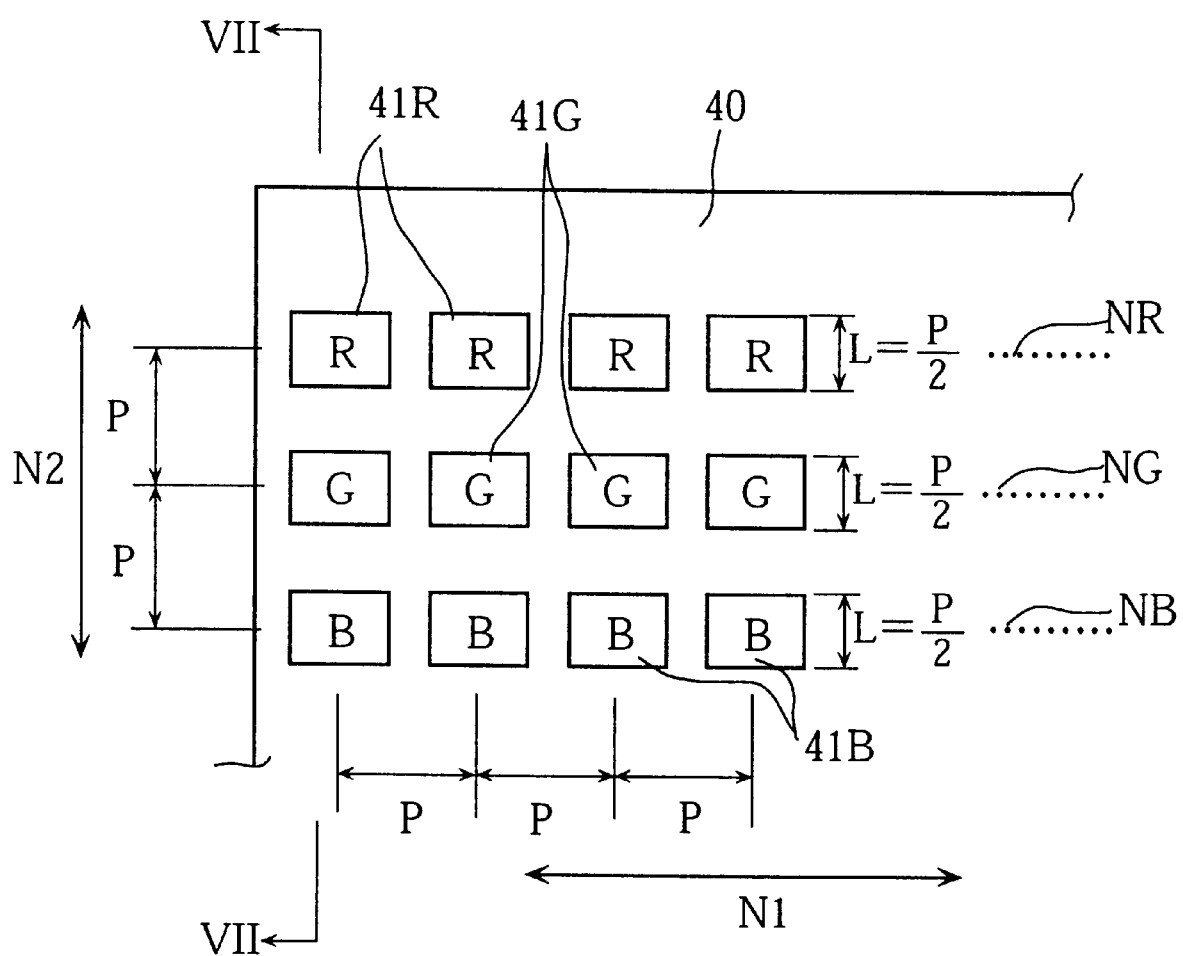
FIG. 6 is a plan view showing an image sensor chip used for the image reading apparatus of FIG. 1.

Reference is now made to FIG. 6. As illustrated, each of the image sensor chips 40, which is rectangular in plan view, comprises a chip substrate carrying plural rows NR, NG, NB of light receiving elements 41R, 41G, 41B. Each of the rows NR, NG, NB extends in the primary scanning direction N1, and the respective rows include a different kind of light receiving elements in identical number and arrangement. According to the illustrated embodiment, specifically, the image sensor chip 40 comprises a first row NR of red light receiving elements 41R, a second row NG of green light receiving elements 41G, and a third row NB of blue light receiving elements 41B, arranged in the mentioned order in the secondary scanning direction N2. Thus, the second row NG of green light receiving elements 41G is interposed between the first row NR of red light receiving elements 41R and the third row NB of blue light receiving elements 41B.

As appreciated from FIG. 1, each of the image sensor chips 40 is mounted on the circuit board 4 with its longitudinal axis extending in the primary scanning direction. Therefore, each row NR, NG, NB of light receiving elements 41R, 41G, 41B of each image sensor chip 40 is aligned with a corresponding row of light receiving elements of any other image sensor chip with respect to the secondary scanning direction. For enabling the respective image sensor chips 40 to be positioned accurately on the circuit board 4, each of the image sensor chips 40 may be formed with a positional reference mark (not shown). The number of the image sensor chips 40 to be mounted on the circuit board 4 may be selected depending on the width of the document sheet to be read by the image scanner A.

Referring back to FIG. 6, each row NR, NG, NB of light receiving elements 41R, 41G, 41B in each image sensor chip 40 may has a pitch P between the light receiving elements in the primary scanning direction N1. The pitch between the light receiving elements in the secondary scanning direction N2 is also set to P. Each light receiving element has a length of L in the secondary scanning direction. In the illustrated embodiment, L is equal to P/2.

Typically, each of the light receiving elements 41R, 41G, 41B may comprise a phototransistor which is capable of providing photoelectric conversion for generating a voltage in accordance with the amount of received light. The color selectivity of the phototransistor may be provided by using a color filter.

Figure 7:
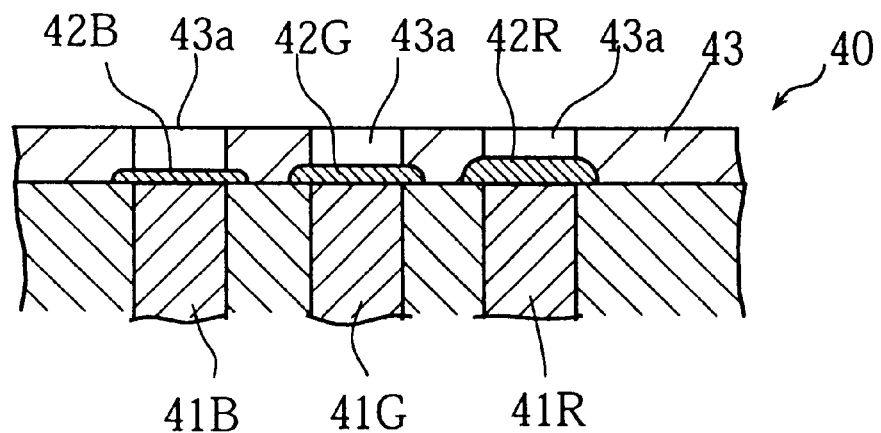
FIG. 7 is a sectional view taken along lines VII—VII in FIG. 6.

Thus, as shown in FIG. 7, each red light receiving element 41R is covered by a red filter 42R which allows selective permeation of red light, whereas each green light receiving element 41G is covered by a green filter 42G which allows selective permeation of green light. Similarly, each blue light receiving element 41B is covered by a blue filter 42B which allows selective permeation of blue light. Each of the color filters 42R, 42G, 42B, which may be made of e.g., an appropriately colored photosensitive resin or film, is slightly larger in length and width than a corresponding light receiving element. As illustrated, the surface of the chip substrate of the image sensor chip 40 is covered by a protection layer 43 which is black. The protection layer 43 is formed with a plurality of through-holes 43a corresponding in position to the light receiving elements 41R, 41G, 41B, respectively.

Of the three color filters, the red filter 42R has the greatest thickness. On the other hand, the green filter 42G has an intermediate thickness, while the blue filter 42B has the smallest thickness. With such an arrangement, the blue filter 42B has the greatest light transmittance, whereas the green filter 42G has the second greatest transmittance, and the red filter 42R has the smallest transmittance. In this way, the sensitivity of the respective light receiving elements can be equalized. The specific thickness of the respective color filters may be determined by experiment in the following manner.

First, a red-colored test chart is prepared. Then, the red test chart is read out by the image scanner A, and the level of an image signal supplied by the light receiving element 41R is measured. Similar steps are performed, using a green-colored test chart for the light receiving element 41G, and a blue-colored test chart for the light receiving element 41B. The thickness of the respective color filters is determined so that the levels of the image signals supplied from the respective color filters are the same.

Figure 8:
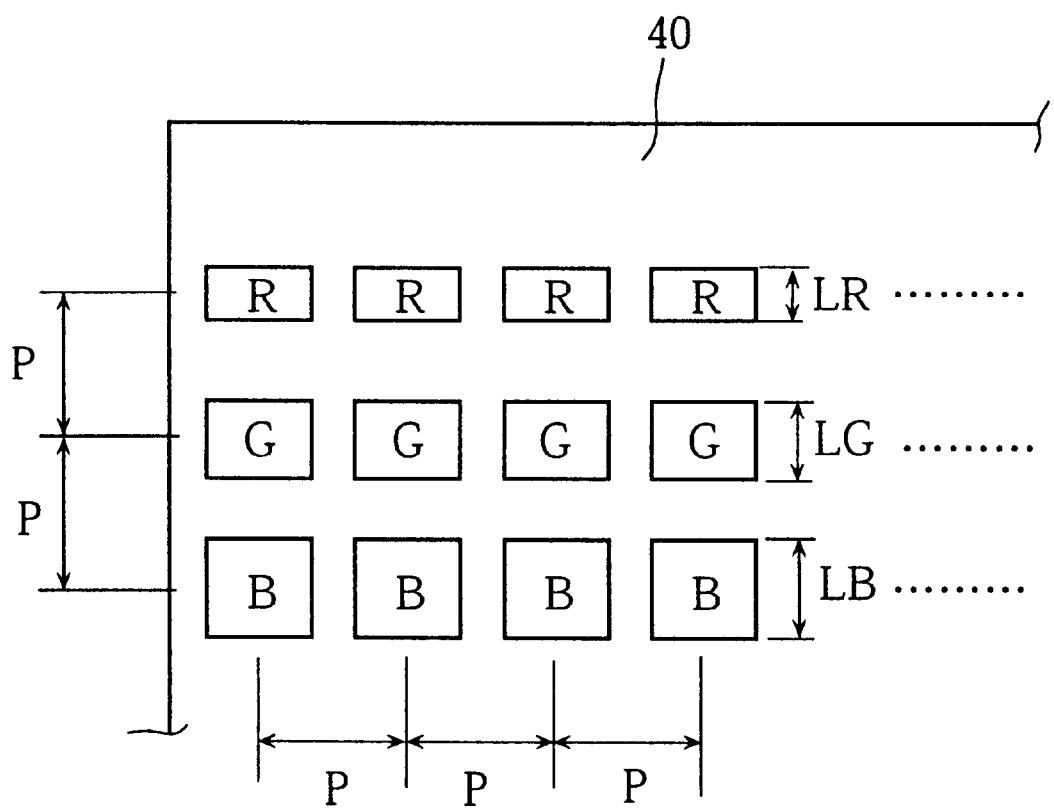
FIG. 8 is a plan view showing a modified arrangement of the image sensor chip of FIG. 6.

The sensitivity control for the light receiving elements 41R, 41G, 41B may be provided in anther way. For instance, as shown in FIG. 8, the surface areas of the light receiving elements may be rendered different from each other. In the illustrated example, the length LR of the element 41R is the smallest, while the length LG of the element 41G is the second smallest, and the length LB of the element 41B is the greatest. The widths of the respective elements 41R, 41G, 41B are all the same in the illustrated example.

Figure 9:
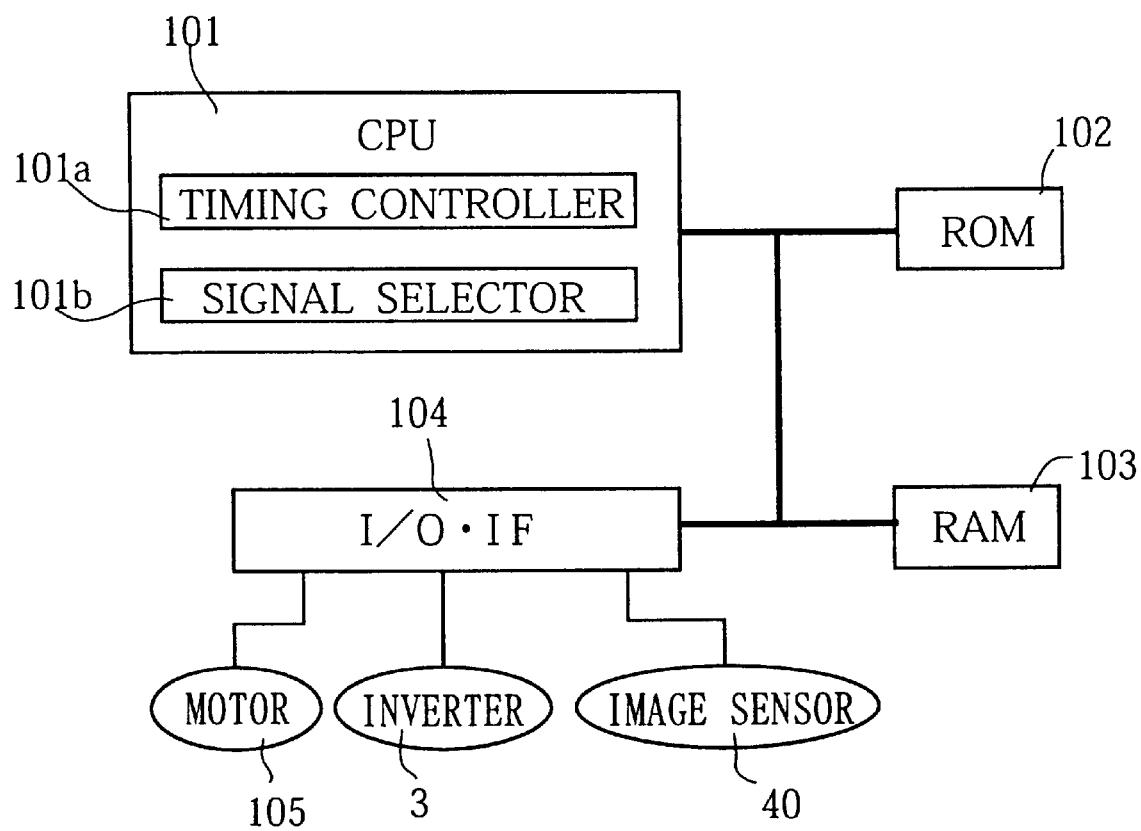
FIG. 9 is a block diagram showing a control system used for the image reading apparatus of FIG. 1.

Reference is now made to FIG. 9 which is a block diagram illustrating a controlling section of the image scanner A of the present invention. The control section includes a CPU (central processing unit) 101, a ROM (read-only memory) 102, a RAM (random-access memory) 103, and an I/O·IF (input/output interface) 104. The CPU 101 includes a timing controller 101a and a signal selector 101b.

The CPU 101 provides an overall control of the image scanner A as a whole. The ROM 102 stores various programs or the like as required for operating the CPU 101. The RAM 103 provides a working area for the CPU 101 while also storing digital data such as image data and the like. The I/O interface 104 functions for the CPU 101 for data transmission to and/or from the image sensor chips 40, the inverter 3, and a motor 105. The I/O interface 104 also serves to convert analog image signals into digital image signals. The motor 105 is used to actuate rollers (not shown) for transferring document sheets in the secondary scanning direction.

Figure 11:
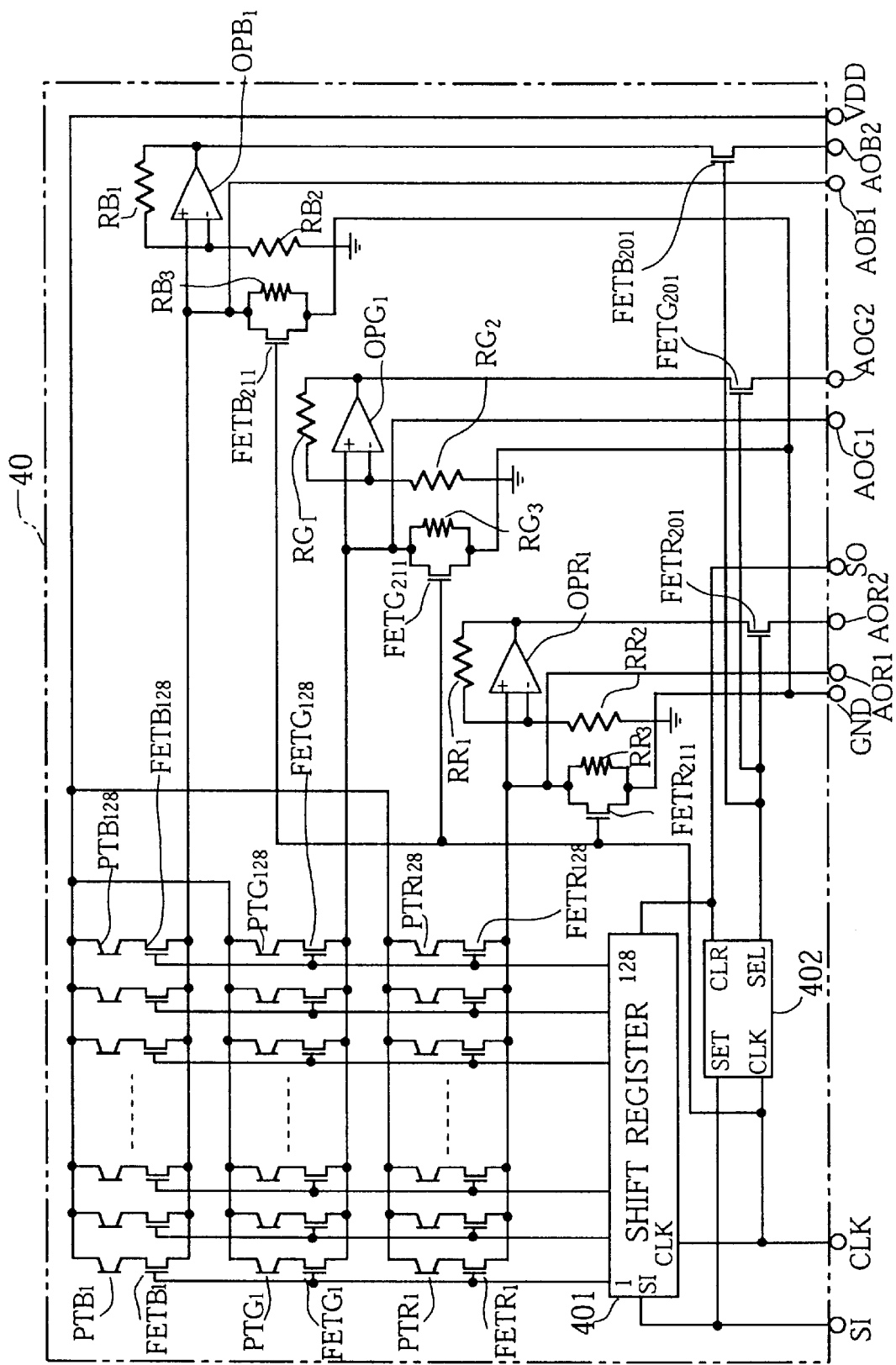
FIG. 11 is a circuit diagram of the image sensor chip of FIG. 6.

Each of the image sensor chips 40 has a photoelectric conversion circuit for its operation, as shown in FIG. 11. More specifically, the photoelectric conversion circuit incorporates a 128-bit shift register 401, a chip selector 402, a group of red light phototransistors PTR1–PTR128 (constituting the red light receiving elements 41R), a group of green light phototransistors PTG1–PTG128 (constituting the green light receiving elements 41G), a group of blue light phototransistors PTB1–PTB128 (constituting the blue light receiving elements 41B), a group of first red light field-effect transistors FETR1–FETR128, a group of first green light field-effect transistors FETG1–FETG128, a group of first blue light field-effect transistors FETB1–FETB128, a second red light field-effect transistor FETR201, a second green light field-effect transistor FETG201, a second blue light field-effect transistor FETB201, a third red light field-effect transistor FETR211, a third green light field-effect transistor FETG211, a third blue light field-effect transistor FETB211, a red light operation amplifier OPR1, a green light operation amplifier OPG1, a blue light operation amplifier OPB1, a group of three red light resistors RR1–RR3, a group of three green light resistors RG1–RG3, a group of three blue light resistors RB1–RB3, and eleven terminal pads SI, CLK, GND, AOR1, AOR2, SO, AOG1, AOG2, AOB1, AOB2, VDD. Each of the first field-effect transistors FETR1–FETR128, FETG1–FETG128, FETB1–FETB128, the second field-effect transistors FETR201, FETG201, FETB201 and the third field-effect transistors FETR211, FETG211, FETB211 may be a MOS (metal oxide semiconductor) field-effect transistor.

Selected ones of the pads SI, CLK, GND, AOR1, AOR2, SO, AOG1, AOG2, AOB1, AOB2, VDD are connected to an external circuitry (not shown) through the connector 49 (see FIG. 1). The pad SI receives serial-in signals. The pad CLK is fed with clock signals of e.g., 8 MHz. The pad GND is used for grounding purposes. The pad AOR1 outputs a non-amplified analog image signal corresponding to the received amount of red light, whereas the pad AOR2 outputs an amplified red image signal. The pad AOG1 outputs a non-amplified analog image signal corresponding to the received amount of green light, whereas the pad AOG2 outputs an amplified green image signal. The pad AOB1 outputs a non-amplified analog image signal corresponding to the received amount of blue light, whereas the pad AOB2 outputs an amplified blue image signal. The pad SO outputs serial-out signals. The pad VDD is supplied with a logic power voltage of 5 volts for example.

Next, description is made to an example of using the image scanner A to perform image reading.

First, a document sheet K is advanced on the glass plate 9, and the cold-cathode tube 2 is turned on to generate white light for irradiating the document sheet K. The white light reflected on the document sheet K is collected by the lens array 7 for focusing on the array of image sensor chips 40, thereby forming a non-inverted, non-magnified image at the respective rows of light receiving elements 41R, 41G, 41B.

In accordance with the received amount of light, the light receiving elements 41R, 41G, 41B generate electric signals. More specifically, under the control of the timing controller 101a of the CPU 101, the light receiving elements 41R, 41G, 41B output a first group of image signals for one scanning line while the document sheet K is advanced by a distance of (P–L). Then, under the control of the timing controller 101a again, the light receiving elements 41R, 41G, 41B output a second group of image signals for the same scanning line while the document sheet K is advanced by an additional distance of L.

According to the illustrated embodiment, the image signals of the first group are stored in the RAM 103 as necessary signals under the control of the signal selector 101b of the CPU 101, whereas the image signals of the second group are ignored or discarded as unnecessary image signals. Alternatively, however, the image signals in the first portion may be ignored, whereas the image signals in the second portion may be stored in the RAM 103 for further processing.

It should be appreciated that while the document sheet K is advanced by a distance of (P–L), the light receiving elements 41R, 41G, 41B will scan the document sheet K by a distance of P in the second scanning direction. Thus, by ignoring the image signals of the second group, as described above, it is possible to perform image reading for each scanning line in a non-overlapping manner as viewed in the secondary scanning direction.

Figure 10:
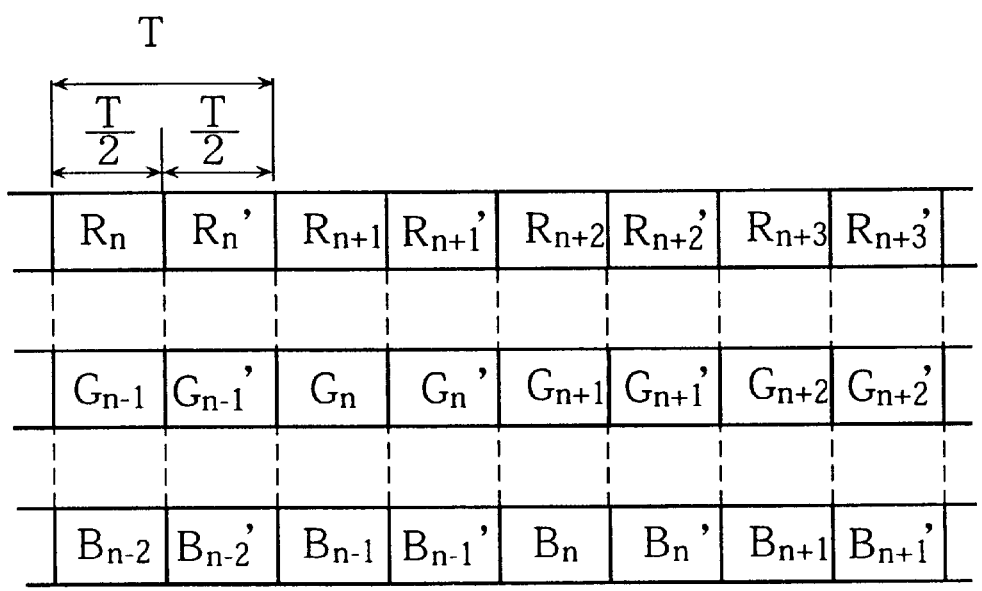
FIG. 10 illustrates output timing of image signals supplied from light receiving elements of the image sensor chip of FIG. 6.

In this regard, reference is made to FIG. 10, wherein T represents a time taken for the document sheet K to be advanced by the distance P. Red light image signals generated by the light receiving elements 41R during the first half of T are designated by Rn, Rn+1, Rn+2 and so forth, while red light image signals generated by the same elements 41R during the second half of T are designated by Rn', Rn+1', Rn+2', and so forth. Similarly, green light image signals generated by the light receiving elements 41G during the first half of T are designated by Gn–1, Gn, Gn+1 and so forth, while green light image signals generated by the same elements 41G during the second half of T are designated by Gn–1', Gn', Gn+1' and so forth. Further, blue light image signals generated by the light receiving elements 41B during the first half of T are designated by Bn–2, Bn–1, Bn and so forth, while blue light image signals generated by the same elements 41B during the second half of T are designated by Bn-21, Bn–1', Bn' and so forth.

According to the present invention, the image signals Rn, Rn+1, Rn+2, . . . , Gn–1, Gn, Gn+1, . . . ,Bn–2, Bn–1, Bn, . . . (the first group of image signals) are adopted as necessary signals, while the image signals Rn', Rn+1', Rn+2', . . . , Gn–1', Gn', Gn+1', . . . ,Bn–2', Bn–1', Bn', . . . (the second group of image signals) are ignored by the CPU 101.

Next, description is made to operational details of the image sensor chips 40.

Image reading by the image scanner A takes place serially or successively from one image sensor chip 40 to the next in the array. Specifically, for example, the serial image reading starts from the left-end image sensor chip 40 (first image sensor chip) in the array shown in FIG. 1 and ends at the right-end image sensor chip (last image sensor chip). The image reading process in each of the image sensor chips 40 is performed in the following manner.

While clock signals of e.g., 8 MHz are input to the pad CLK, serial-in signals are supplied to the pad SI. The serial-in signals thus supplied are input to a set terminal of the chip selector 402. As a result, the chip selector 402 outputs high-level select signals from a select-out terminals in synchronism with the clock signals. The high-level select signals, which are obtained by inverting the clock signals, are then input to the respective gates of the second field-effect transistors FETR201, FETG201, FETB201, thereby causing these transistors to turn on while the clock signals are held at the low level.

On the other hand, the serial-in signals are also supplied to a serial-in terminal of the shift register 401 in synchronism with the clock signals which are input to a clock terminal of the shift register 401. When a serial-in signal is input to the first bit of the shift register 401 in synchronism with the drop of a clock signal, the first bit becomes ON to feed a high-level signal to the respective gates of the first field-effect transistors FETR1, FETG1, FETB1 (corresponding to the first bit of the shift register 401), thereby causing these transistors to turn on. At this time, since the clock signal is at the low level, the respective third field-effect transistors FETR211, FETG211, FETB211 receiving the clock signal without inversion are held OFF. As a result, a current passes through the respective resistors PR3, PG3, PB3 due to the charge which is accumulated at the respective phototransistors PTR1, PTG1, PTB1 and discharged through the relevant first field-effect transistors FETR1, FETG1, FETB1. The voltage across the respective resistors PR3, PG3, PB3 is input to the non-inverting terminal of the respective operation amplifiers OPR1, OPG1, OPB1 and thereby amplified with an amplification factor which is determined by the resistance ratio between a respective one of the resistors PR1, PG1, PB1 and a respective one of the resistors PR2, PG2, PB2. The amplified voltage thus obtained is output from the respective pads AOR2, AOG2, AOB2 through the respective second field-effect transistors FETR201, FETG201, FETB201 which are held ON while the clock signal is held at the low level, i.e., while the select signal is held at the high level. At the same time, the non-amplified voltage across the respective resistors PR3, PG3, PB3 is output from the respective pads AOR1, AOG1, AOB1.

Conversely, when the clock signal rises from the low level to the high level, the respective second field-effect transistors FETR201, FETG201, FETB201 turn off, but the respective third field-effect transistors FETR211, FETG211, FETB211 turn on. As a result, no output is available from the respective pads AOR2, AOG2, AOB2, and the remaining charge of the respective phototransistors PTR1, PTG1, PTB1 is discharged through the respective first field-effect transistors FETR1, FETG1, FETB1 and the respective third field-effect transistors FETR211, FETG211, FETB211. When the clock signal subsequently drops again from the high level to the low level, the serial-in signal previously held at the first bit of the shift register 401 is shifted to the second bit to turn on the respective first field-effect transistors FETR2, FETG2, FETB2 corresponding to the second bit, and the respective second field-effect transistors FETR201, FETG201, FETB201 turn on. As a result, the charge of the respective second-bit phototransistors PTR2, PTG2, PTB2 is discharged through the relevant first field-effect transistors FETR2, FETG2, FETB2, thereby generating a voltage across the respective resistors PR3, PG3, PB3. The voltage thus generated is output from the respective pads AOR1, AOG1, AOB1 without amplification as well as from the respective pads AOR2, AOG2, AOB2 after amplification at the respective amplifiers OPR1, OPG1, OPB1.

By repeating the above steps, the other phototransistors PTR3–PTR128, PTG3–PTG128, PTB3–PTB128 of the same image sensor chip 40 (the first image sensor chip) for the respective colors (red, green and blue) may be successively scanned for output of non-amplified image signals from the respective pads AOR1, AOG1, AOB1 while also outputting amplified image signals from the respective pads AOR2, AOG2, AOB2. When the serial-in signal is output from the last bit of the shift register 401 at a relevant drop of the clock signal, the serial-in signal is input to a clear terminal of the chip selector 402 while also being taken out as a serial-out signal from the pad SO. As a result, the chip selector 402 of the first image sensor chip 40 keeps the select signal at the low level.

The serial-out signal from the pad SO of the first image sensor chip 40 (the left-end image sensor chip in FIG. 1) is input to the pad SI of the next image sensor chip 40 (second image sensor chip) as a serial-in signal. This causes the second image sensor chip 40 to operate in the same way as the first image sensor chip.

The third and any subsequent image sensor chips 40 operate successively in the same manner as the first and second image sensor chips.

The analog image signals (for the respective colors) from the right-end image sensor chip or last image sensor chip are converted into digital signals by the I/O interface 104 to be stored in the RAM 103. Here, it should be noted that the digital signals to be stored in the RAM 103 are obtained while the document sheet K is being advanced by a distance of (P–L).

On the other hand, in the illustrated embodiment, the image signals generated by the respective light receiving elements during the second half of T are ignored by the signal selector 101b of the CPU 101.

In the embodiment described above, the CPU 101 (or the signal selector 101b thereof) selects the necessary image signals to be stored in the RAM 103. Alternatively, the selection may be performed by the I/O interface 104. In this case, the selection may be made by converting only the necessary analog signals into digital signals while the unnecessary image signals are not converted into digital signals.

According to the present invention, it is also possible to arrange that necessary image signals for each scanning line are output from the light receiving elements 41R, 41G, 41B while the document sheet K is being advanced by a distance which is slightly smaller than (P–L).

Figure 12:
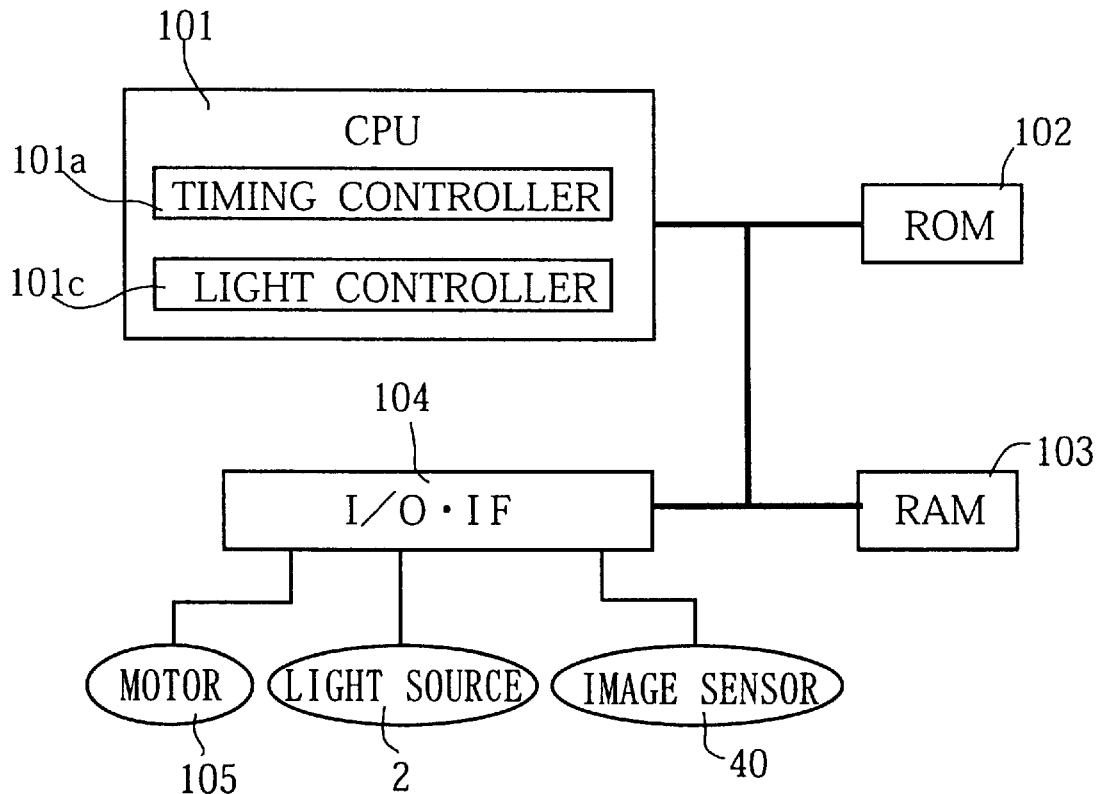
FIG. 12 shows a modified version of a control system.
Figure 13:
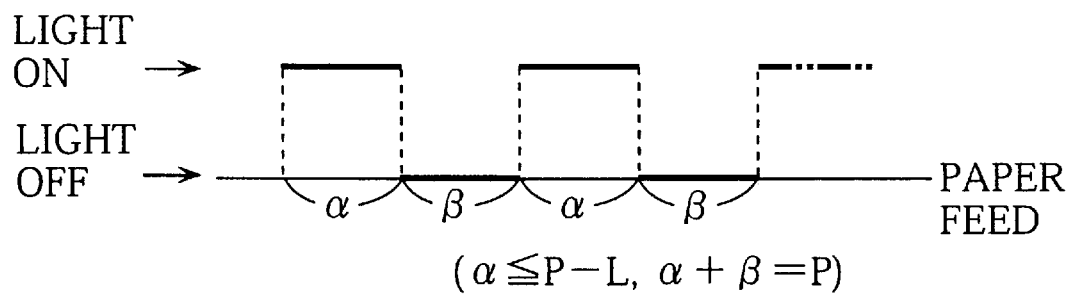
FIG. 13 illustrates a relationship between a paper feed and actuation of a light source.
Figure 14:
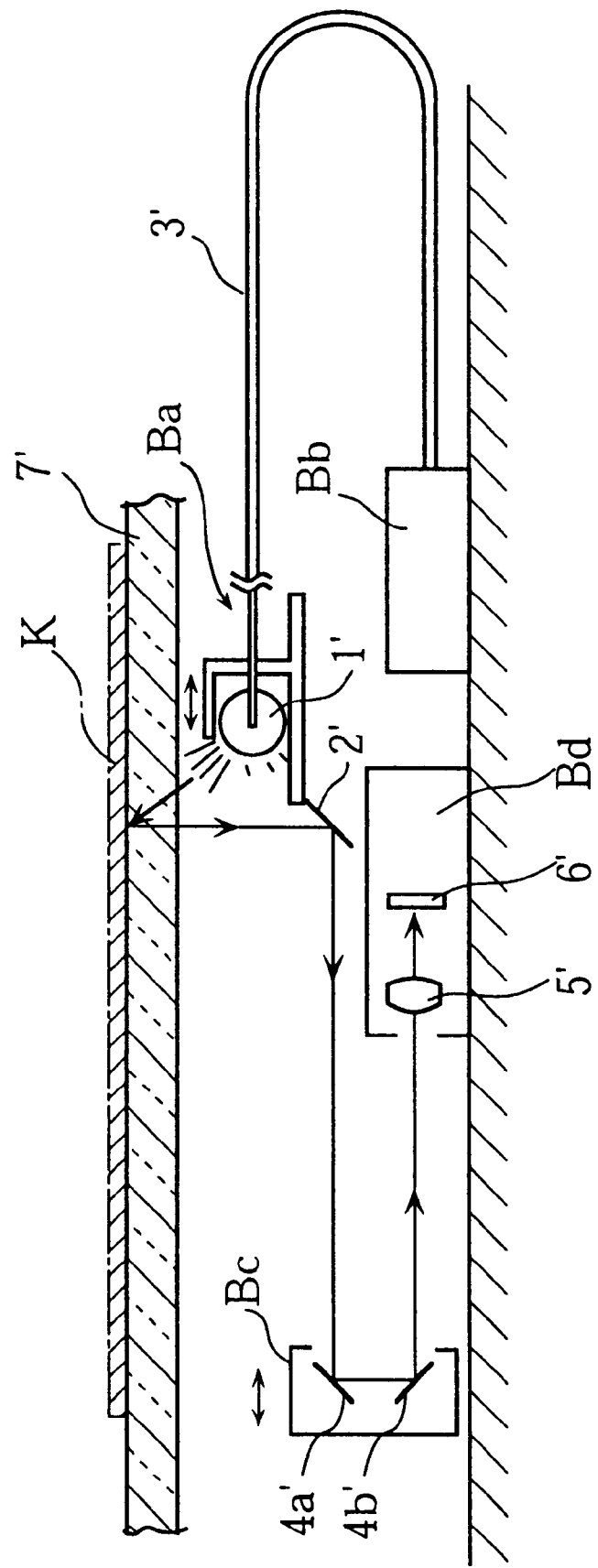
FIG. 14 illustrates a conventional image reading apparatus.
Figure 15:
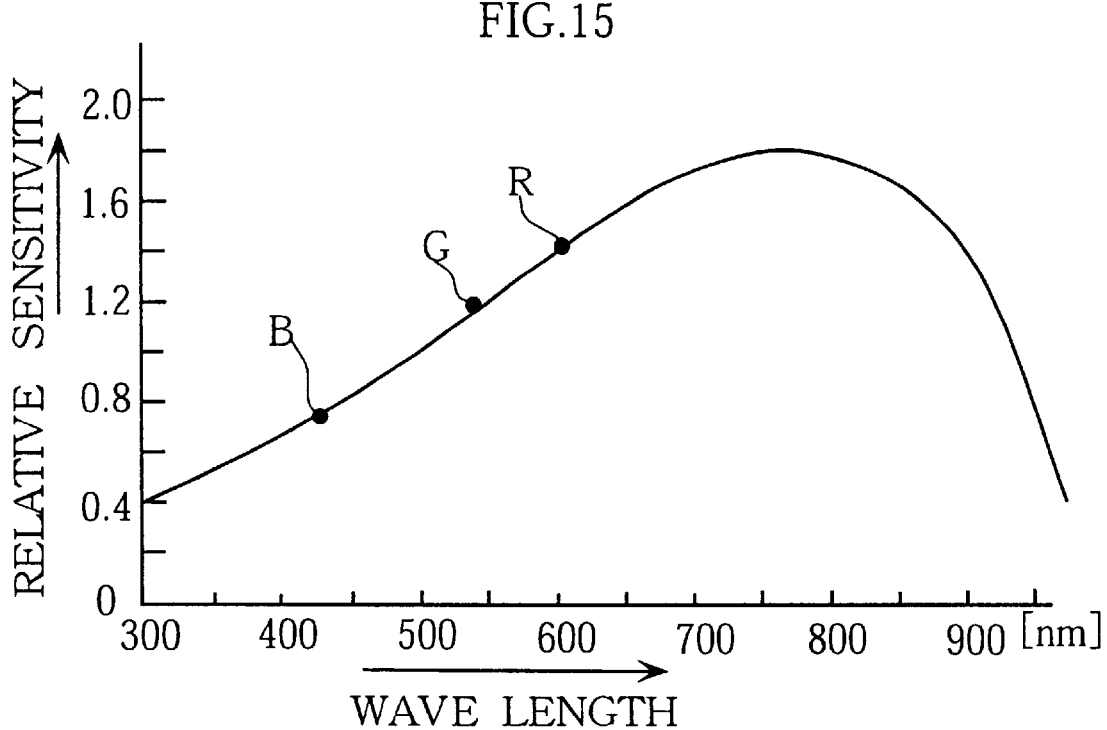
FIG. 15 shows a relationship between wave lengths of light and relative sensitivities of light receiving elements.
Figure 16:
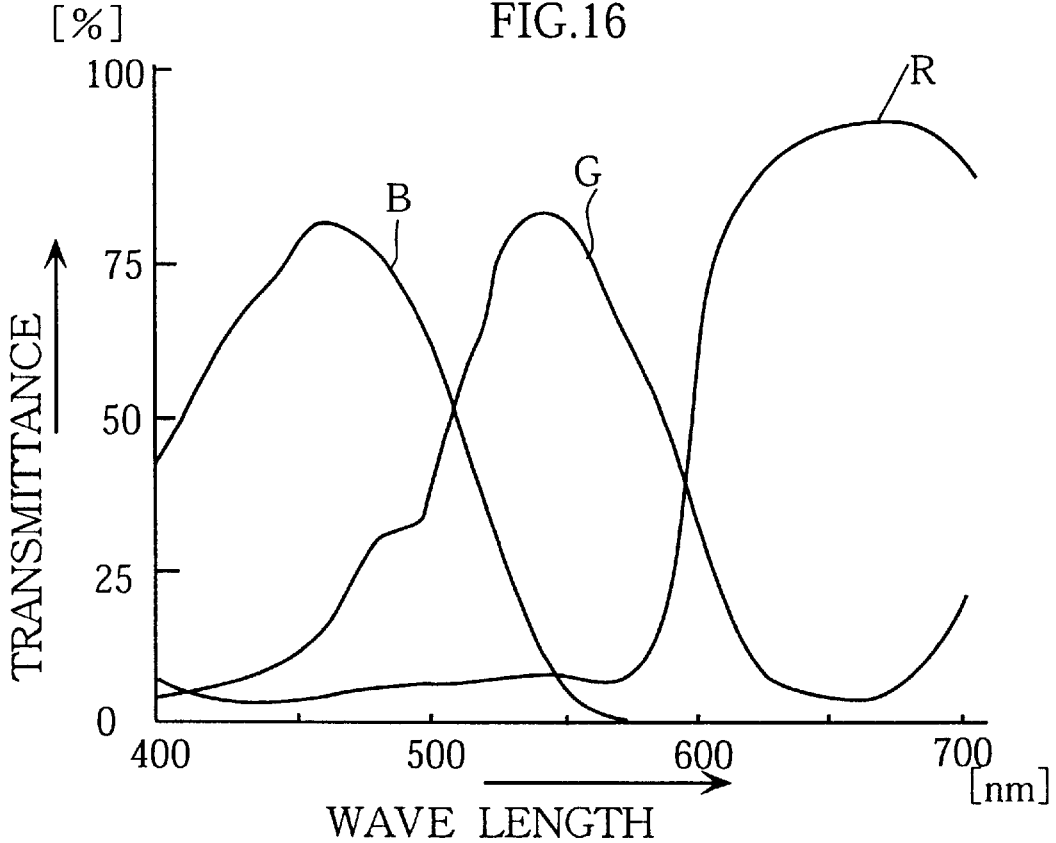
FIG. 16 shows a relationship between wave lengths of light and transmittances of color filters.
Figure 17:
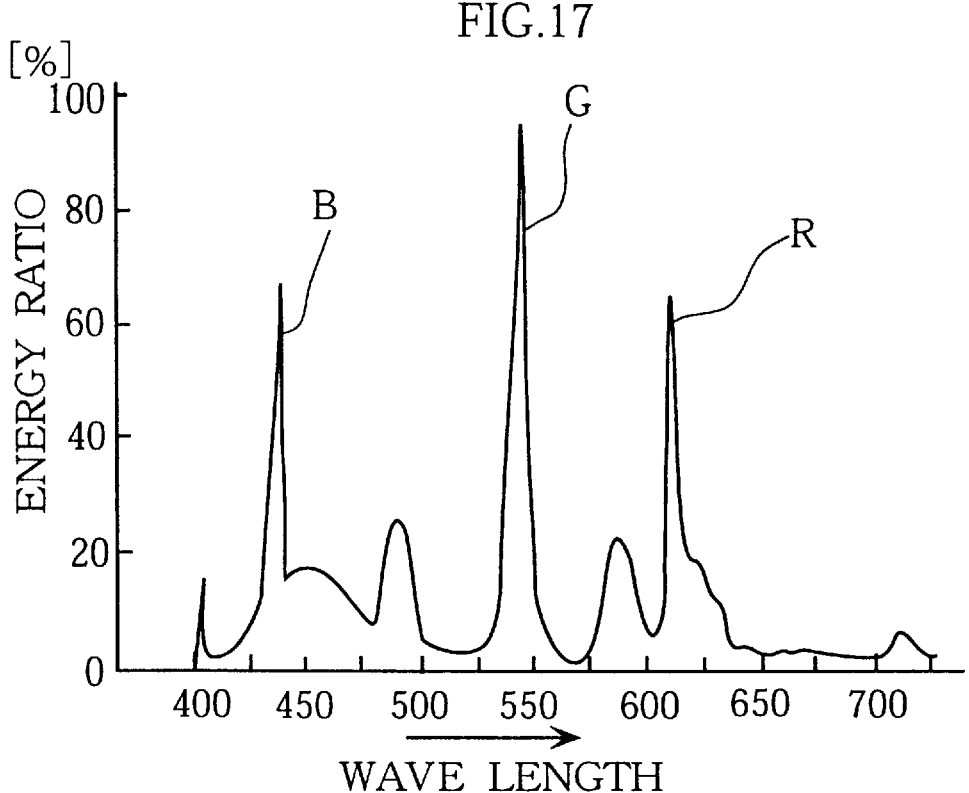
FIG. 17 shows a relationship between wave lengths of light emitted from a cold-cathode tube and energy ratios of the same light.
Figure 18:
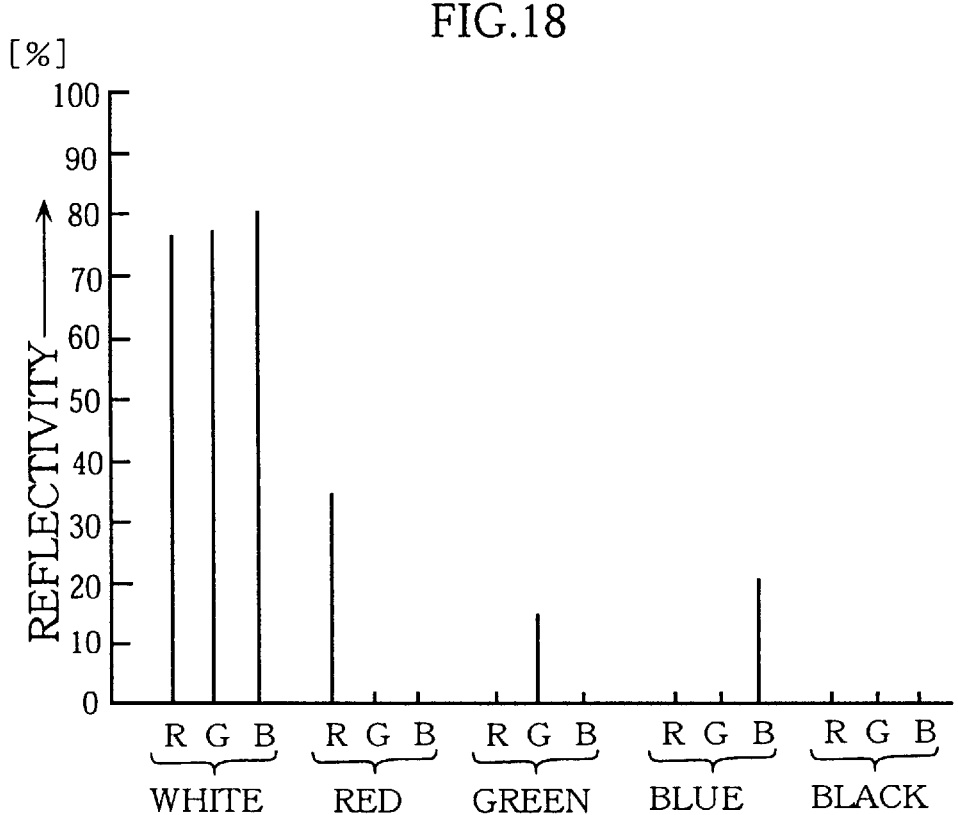
FIG. 18 illustrates how well various test charts reflect light.
Figure 19:
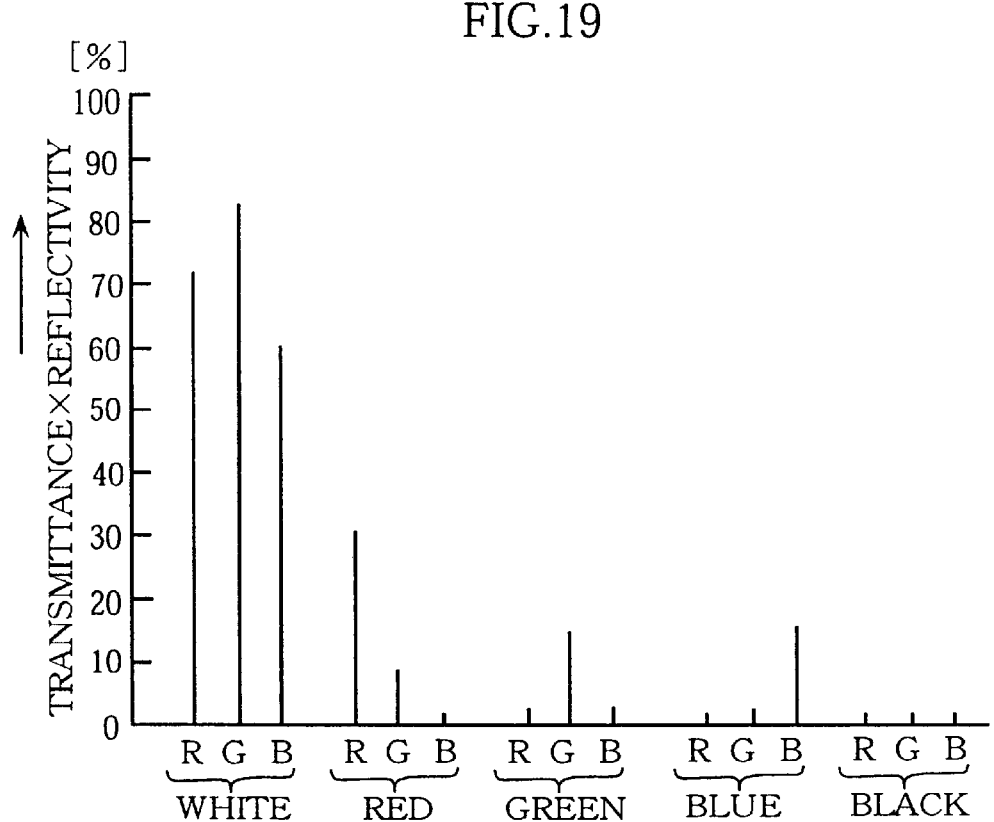
FIG. 19 shows variations of products of the filter transmittance and the test chart reflectivity.
Figure 20:
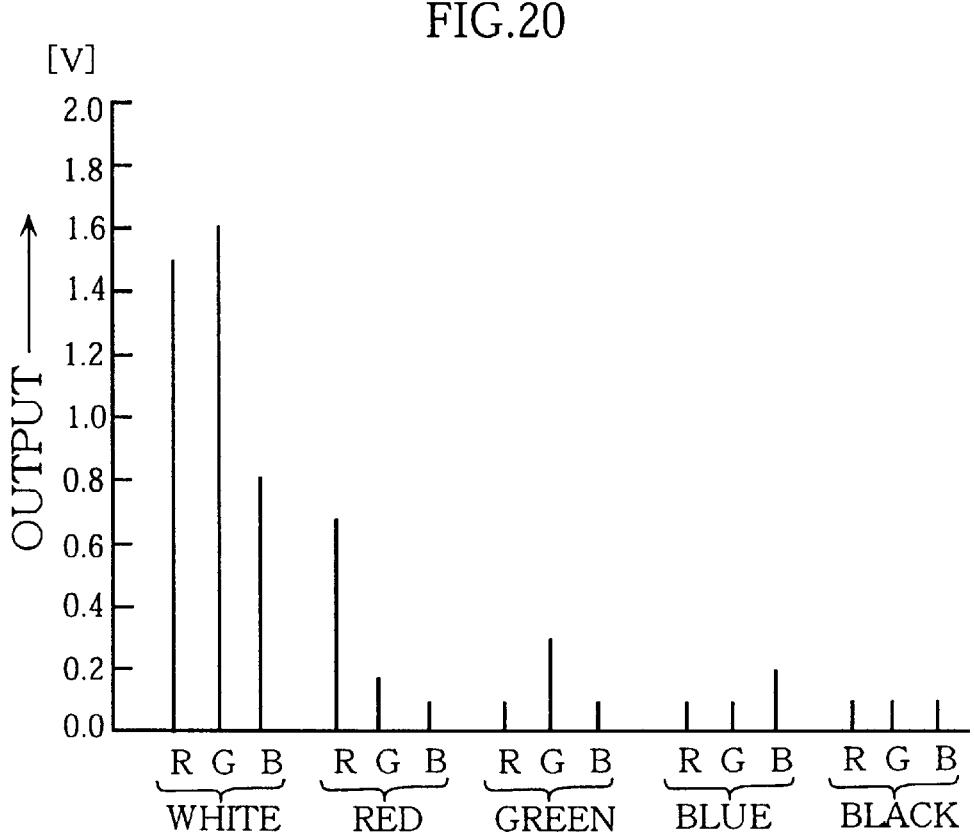
FIG. 20 shows variations of outputs from an image sensor chip.
Figure 21:
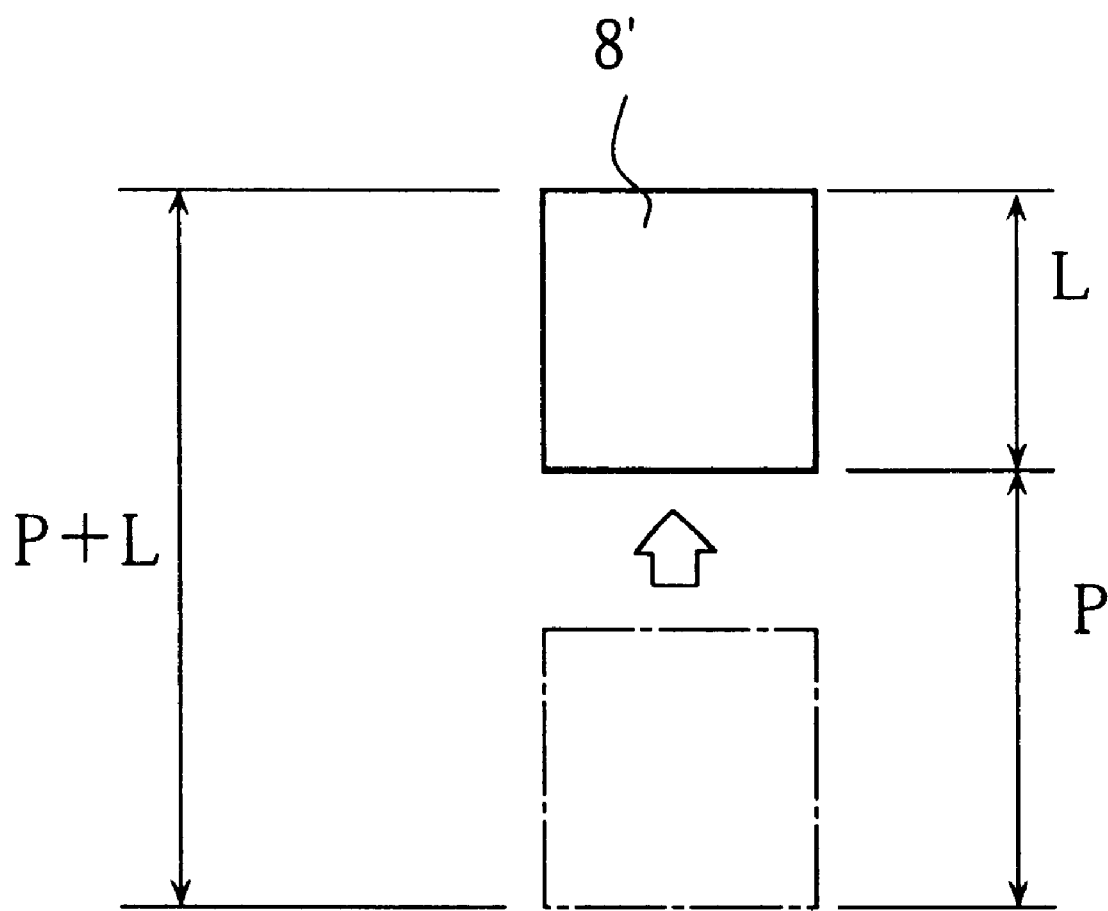
FIG. 21 illustrates the movement of a light receiving element.

Reference is now made to FIGS. 12 and 13 which illustrate a second embodiment of the present invention. In this embodiment, the CPU 101 includes an output timing controller 101a as in the first embodiment, and a light controller 101c, as shown in FIG. 12. For a light source, use may be made to an LED (light-emitting diode) capable of emitting white light.

According to the second embodiment, under the control of the light controller 101c, the light source is turned on while the document sheet K is being advanced by a distance α while the light is turned off while the document sheet K is being advanced by another distance α. Here, a is no greater than (P–L), and (α+β) is equal to P. As is illustrated, the light is turned on again while the document sheet K is being advanced by another distance α, and turned off again while the document sheet K is being advanced by another distance α.

In the above embodiment, under the control of the output timing controller 101a, each of the light receiving elements outputs an image signal when the light source is turned off.

The preferred embodiments of the present invention being thus described, it is obvious that the same may be varied in various ways.

For instance, the sensitivity control for the light receiving elements may be performed by adjusting the amplification factors of the operation amplifiers OPR1, OPG1, OPB1. In this case, the amplification factor of the operation amplifier OPR1 may be the smallest, the amplification factor of the operation amplifier OPG1 may be the second smallest, and the amplification factor of the operation amplifier OPB1 may be the greatest.

Further, the sensitivity control for the light receiving elements may be performed by adjusting the luminance of components (red, green and blue) of white light generated by the cold-cathode tube. Specifically, the luminance of the blue component may be rendered the greatest, the luminance of the green component may be rendered the second greatest, and the luminance of the red component may be rendered the smallest.

Such variations should not be regarded as a departure from the spirit and scope of the invention, and all such variations as would be obvious to those skilled in the art are intended to be included within the scope of the appended claims.

What is claimed is:

1. An image sensor chip comprising:

a chip substrate;

a row of red light receiving elements formed in the chip substrate and arranged in a first direction for detecting red light, each of the red light receiving elements being covered by a red filter;

a row of green light receiving elements formed in the chip substrate and arranged in the first direction for detecting green light, each of the green light receiving elements being covered by a green filter; and a row of blue light receiving elements formed in the chip substrate and arranged in the first direction for detecting blue light, each of the blue light receiving elements being covered by a blue filter;

wherein the red, green and blue filters have predetermined thicknesses, the thickness of the red filter being greater than the thickness of the green filter, the thickness of the green filter being greater than the thickness of the blue filter.

2. An image sensor chip comprising:

a chip substrate;

a row of red light receiving elements formed in the chip substrate and arranged in a first direction for detecting red light, each of the red light receiving elements being covered by a red filter;

a row of green light receiving elements formed in the chip substrate and arranged in the first direction for detecting green light, each of the green light receiving elements being covered by a green filter;

a row of blue light receiving elements formed in the chip substrate and arranged in the first direction for detecting blue light, each of the blue light receiving elements being covered by a blue filter;

a first amplifier for the row of red light receiving elements;

a second amplifier for the row of green light receiving elements; and a third amplifier for the row of blue light receiving elements;

wherein an amplification factor of the first amplifier is smaller than an amplification factor of the second amplifier, the amplification factor of the second amplifier being smaller than an amplification factor of the third amplifier.

* * * * *